US011407255B2

(12) United States Patent
Ebiko (10) Patent No.: US 11,407,255 B2
(45) Date of Patent: Aug. 9, 2022

(54) PNEUMATIC TIRE

(71) Applicant: The Yokohama Rubber Co., LTD., Tokyo (JP)

(72) Inventor: Masahiro Ebiko, Hiratsuka (JP)

(73) Assignee: The Yokohama Rubber Co., LTD., Tokyo (JP)

(*) Notice: Subject to any disclaimer, the term of this patent is extended or adjusted under 35 U.S.C. 154(b) by 791 days.

(21) Appl. No.: 16/096,672

(22) PCT Filed: Feb. 22, 2017

(86) PCT No.: PCT/JP2017/006667
§ 371 (c)(1),
(2) Date: Oct. 25, 2018

(87) PCT Pub. No.: WO2017/187740
PCT Pub. Date: Nov. 2, 2017

(65) Prior Publication Data
US 2021/0221179 A1     Jul. 22, 2021

(30) Foreign Application Priority Data
Apr. 26, 2016  (JP) .............................. JP2016-088077

(51) Int. Cl.
  *B60C 11/00*  (2006.01)
  *B60C 11/03*  (2006.01)
  *B60C 11/12*  (2006.01)

(52) U.S. Cl.
  CPC .......... *B60C 11/0306* (2013.01); *B60C 11/12* (2013.01); *B60C 2011/0348* (2013.01);
  (Continued)

(58) Field of Classification Search
  CPC ................. B60C 11/0306; B60C 11/12; B60C 2011/0348; B60C 2011/0365;
  (Continued)

(56) References Cited

U.S. PATENT DOCUMENTS 7,802,596 B2 * 9/2010 Hashimoto ........... B60C 11/033
152/209.18
9,522,573 B2 * 12/2016 Nishiwaki ........... B60C 11/0309
(Continued)

FOREIGN PATENT DOCUMENTS

JP    2006-131098    5/2006
JP    2009-096220    5/2009
(Continued)

OTHER PUBLICATIONS

International Search Report for International Application No. PCT/JP2017/006667 dated Apr. 25, 2017, 4 pages, Japan.

*Primary Examiner* — Jeffrey M Wollschlager
*Assistant Examiner* — Shibin Liang
(74) *Attorney, Agent, or Firm* — Thorpe North & Western (57) ABSTRACT

A pneumatic tire includes: main grooves in a tread, extending in a circumferential direction in alignment in a lateral direction, defining a center land on an equatorial plane and middle lands on outer sides in the lateral direction; a sipe formed in the center land communicating with a center main groove and terminating within the center land, the sipe bending halfway through its length; a circumferential narrow groove in each of the middle lands dividing the middle lands into a rib-shaped middle inner land and a middle outer land; and lug grooves formed in the middle outer land in alignment in the circumferential direction, communicating with a shoulder main groove and the circumferential narrow groove and dividing the middle outer land into blocks. A width d1 of the middle inner land and a groove width d2 of the circumferential narrow groove satisfy a relationship of $0.1 \leq d2/d1 \leq 0.4$.

8 Claims, 5 Drawing Sheets

(52) U.S. Cl.
CPC ............... *B60C 2011/0365* (2013.01); *B60C 2011/0372* (2013.01); *B60C 2011/0381* (2013.01); *B60C 2011/0388* (2013.01); *B60C 2011/1209* (2013.01)

(58) Field of Classification Search
CPC ..... B60C 2011/0372; B60C 2011/0381; B60C 2011/0388; B60C 2011/1209; B60C 11/03
See application file for complete search history.

(56) References Cited

U.S. PATENT DOCUMENTS

| | | | |
|---|---|---|---|
| 2009/0229721 | A1 | 9/2009 | Ikeda |
| 2010/0078105 | A1 | 4/2010 | Hashimoto |
| 2011/0024012 | A1 | 2/2011 | Iwai |
| 2012/0103488 | A1* | 5/2012 | Kubota ............... B60C 11/0083 152/209.14 |
| 2012/0273104 | A1 | 11/2012 | Ishida |
| 2014/0137999 | A1 | 5/2014 | Rubber |
| 2018/0244104 | A1* | 8/2018 | Kuwayama ......... B60C 11/0008 |

FOREIGN PATENT DOCUMENTS

| | | |
|---|---|---|
| JP | 2009-214775 | 9/2009 |
| JP | 4581732 | 11/2010 |
| JP | 2011-031773 | 2/2011 |
| JP | 2012-045974 | 3/2012 |
| JP | 2012-228992 | 11/2012 |
| JP | 5185989 | 4/2013 |
| JP | 2014-051178 | 3/2014 |
| JP | 5443923 | 3/2014 |
| JP | 2014-101039 | 6/2014 |
| JP | 2015-013603 | 1/2015 |
| WO | WO 2009/047872 | 4/2009 |
| WO | WO 2014/03 8377 | 3/2014 |

* cited by examiner

| | Conventional Example | Comparative Example 1 | Comparative Example 2 | Example 1 | Example 2 | Example 3 |
|---|---|---|---|---|---|---|
| Presence of sipe in center land portion | No | Yes | Yes | Yes | Yes | Yes |
| Sipe form | - | Bend | Bend | Bend | Bend | Bend |
| Presence of circumferential narrow groove in middle land portion | No | Yes | Yes | Yes | Yes | Yes |
| Presence of lug groove in middle land portion | Yes | No | Yes | Yes | Yes | Yes |
| Relationship $d2/d1$ between width $d1$ of middle inner land portion and groove width $d2$ of circumferential narrow groove | - | 0.05 | 0.05 | 0.1 | 0.4 | 0.25 |
| Relationship $d1/tw$ between tread contact width $tw$ and width $d1$ of middle land portion | 0.08 | 0.08 | 0.08 | 0.08 | 0.08 | 0.08 |
| Relationship $d2/tw$ between tread ground width $tw$ and width $d2$ of center land portion | 0.04 | 0.04 | 0.04 | 0.04 | 0.04 | 0.04 |
| Relationship $d2/d1$ between width $d1$ of middle land portion and width $d2$ of center land portion | 0.5 | 0.5 | 0.5 | 0.5 | 0.5 | 0.5 |
| Tire lateral direction length $\alpha$ from one end to bent portion of sipe (mm) | - | 1 | 1 | 1 | 1 | 1 |
| Relationship $\alpha/d2$ between tire lateral direction length $\alpha$ from one end to bent portion of sipe and width $d2$ of center land portion | - | 0.13 | 0.13 | 0.13 | 0.13 | 0.13 |
| Angle $\beta$ of sipe from one end to bent portion relative to tire circumferential direction (°) | - | 30 | 30 | 30 | 30 | 30 |
| Relationship $\gamma/d2$ between tire lateral direction length $\gamma$ of sipe from one end to other end and width $d2$ of center land portion | - | 0.6 | 0.6 | 0.6 | 0.6 | 0.6 |
| Inclination direction of sipe and lug groove | - | Same direction | Same direction | Same direction | Same direction | Same direction |
| Dry road surface steering stability | 100 | 109 | 113 | 106 | 100 | 103 |
| Wet road surface steering stability | 100 | 95 | 85 | 100 | 118 | 112 |

| | Example 4 | Example 5 | Example 6 | Example 7 | Example 8 | Example 9 | Example 10 |
|---|---|---|---|---|---|---|---|
| Presence of sipe in center land portion | Yes | Yes | Yes | Yes | Yes | Yes | Yes |
| Sipe form | Bend | Bend | Bend | Bend | Bend | Bend | Bend |
| Presence of circumferential narrow groove in middle land portion | Yes | Yes | Yes | Yes | Yes | Yes | Yes |
| Presence of lug groove in middle land portion | Yes | Yes | Yes | Yes | Yes | Yes | Yes |
| Relationship $d2/d1$ between width $d1$ of middle inner land portion and groove width $d2$ of circumferential narrow groove | 0.25 | 0.25 | 0.25 | 0.25 | 0.25 | 0.25 | 0.25 |
| Relationship $d1/tw$ between tread contact width $tw$ and width $d1$ of middle land portion | 0.2 | 0.2 | 0.2 | 0.2 | 0.2 | 0.2 | 0.2 |
| Relationship $d2/tw$ between tread ground width $tw$ and width $d2$ of center land portion | 0.2 | 0.3 | 0.3 | 0.3 | 0.2 | 0.2 | 0.2 |
| Relationship $d2/d1$ between width $d1$ of middle land portion and width $d2$ of center land portion | 1.0 | 1.5 | 1.5 | 1.5 | 1.0 | 1.0 | 1.0 |
| Tire lateral direction length α from one end to bent portion of sipe (mm) | 1 | 1 | 10 | 16 | 5 | 10 | 16 |
| Relationship $α/d2$ between tire lateral direction length α from one end to bent portion of sipe and width $d2$ of center land portion | 0.03 | 0.02 | 0.17 | 0.27 | 0.13 | 0.25 | 0.4 |
| Angle β of sipe from one end to bent portion relative to tire circumferential direction (°) | 30 | 30 | 30 | 30 | 30 | 30 | 30 |
| Relationship $γ/d2$ between tire lateral direction length γ of sipe from one end to other end and width $d2$ of center land portion | 0.6 | 0.6 | 0.6 | 0.6 | 0.6 | 0.6 | 0.6 |
| Inclination direction of sipe and lug groove | Same direction | Same direction | Same direction | Same direction | Same direction | Same direction | Same direction |
| Dry road surface steering stability | 106 | 113 | 118 | 123 | 110 | 113 | 116 |
| Wet road surface steering stability | 118 | 116 | 110 | 106 | 116 | 114 | 110 |

FIG. 3B

| | EXAMPLE 11 | EXAMPLE 12 | EXAMPLE 13 | EXAMPLE 14 | EXAMPLE 15 |
|---|---|---|---|---|---|
| PRESENCE OF SIPE IN CENTER LAND PORTION | YES | YES | YES | YES | YES |
| SIPE FORM | BEND | BEND | BEND | BEND | BEND |
| PRESENCE OF CIRCUMFERENTIAL NARROW GROOVE IN MIDDLE LAND PORTION | YES | YES | YES | YES | YES |
| PRESENCE OF LUG GROOVE IN MIDDLE LAND PORTION | YES | YES | YES | YES | YES |
| RELATIONSHIP d2/d1 BETWEEN WIDTH d1 OF MIDDLE INNER LAND PORTION AND GROOVE WIDTH d2 OF CIRCUMFERENTIAL NARROW GROOVE | 0.25 | 0.25 | 0.25 | 0.25 | 0.25 |
| RELATIONSHIP D1/TW BETWEEN TREAD CONTACT WIDTH TW AND WIDTH D1 OF MIDDLE LAND PORTION | 0.2 | 0.2 | 0.2 | 0.2 | 0.2 |
| RELATIONSHIP D2/TW BETWEEN TREAD GROUND WIDTH TW AND WIDTH D2 OF CENTER LAND PORTION | 0.2 | 0.2 | 0.2 | 0.2 | 0.2 |
| RELATIONSHIP D2/D1 BETWEEN WIDTH D1 OF MIDDLE LAND PORTION AND WIDTH D2 OF CENTER LAND PORTION | 1.0 | 1.0 | 1.0 | 1.0 | 1.0 |
| TIRE LATERAL DIRECTION LENGTH α FROM ONE END TO BENT PORTION OF SIPE (mm) | 10 | 10 | 10 | 10 | 10 |
| RELATIONSHIP α/D2 BETWEEN TIRE LATERAL DIRECTION LENGTH α FROM ONE END TO BENT PORTION OF SIPE AND WIDTH D2 OF CENTER LAND PORTION | 0.25 | 0.25 | 0.25 | 0.25 | 0.25 |
| ANGLE β OF SIPE FROM ONE END TO BENT PORTION RELATIVE TO TIRE CIRCUMFERENTIAL DIRECTION (°) | 60 | 90 | 90 | 90 | 90 |
| RELATIONSHIP γ/D2 BETWEEN TIRE LATERAL DIRECTION LENGTH γ OF SIPE FROM ONE END TO OTHER END AND WIDTH D2 OF CENTER LAND PORTION | 0.6 | 0.6 | 0.5 | 0.4 | 0.4 |
| INCLINATION DIRECTION OF SIPE AND LUG GROOVE | SAME DIRECTION | SAME DIRECTION | SAME DIRECTION | SAME DIRECTION | OPPOSITE DIRECTION |
| DRY ROAD SURFACE STEERING STABILITY | 116 | 119 | 122 | 125 | 125 |
| WET ROAD SURFACE STEERING STABILITY | 112 | 108 | 106 | 104 | 102 |

FIG. 4

PNEUMATIC TIRE

TECHNICAL FIELD

The present technology relates to a pneumatic tire.

BACKGROUND ART

A pneumatic tire of the related art, for example, one described in Japan Patent No. 4581732 is designed to improve anti-lateral skid performance under wet conditions and snowing conditions while maintaining braking performance. This pneumatic tire is configured as follows. The tire has three ribs defined by a main groove in a center region of a tread surface. First lug grooves, extending in a tire lateral direction with only one end communicating with the main groove, are formed in the respective ribs at a predetermined interval in a tire circumferential direction. At least one sipe is formed between the each first lug groove of the respective ribs with only one end communicating with the first lug groove and extending in the tire circumferential direction at such a position as to substantially equally divide a rib width. A sipe length in the tire circumferential direction is in a range of 40 to 60% of a distance between the first lug grooves. In both shoulder regions, a rib is defined between an auxiliary groove extending in the tire circumferential direction and an outer main groove.

A pneumatic tire of the related art, for example, one described in Japan Patent No. 5443923 is designed to ensure both of high wet performance and high wear resistance performance. In this pneumatic tire, land portions are defined in a tread by a plurality of circumferential grooves extending along a tire equatorial plane. Every circumferential grooves in contact with the land portion on both sides thereof, have a sipe that opens to the circumferential groove at one end and terminates within the land portion at the other end. The sipe has an inclined portion communicating with the circumferential groove and extending with some inclination to the tire equatorial plane, and a linear portion connected to the inclined portion and extending along the tire equatorial plane.

In a pneumatic tire of the related art, for example, one described in Japan Unexamined Patent Publication No. 2015-013603, no groove is formed in a center land portion and a middle land portion adjacent to the center land portion has a lateral groove communicating with both main grooves.

In a pneumatic tire of the related art, for example, one described in Japan Patent No. 5185989, a groove is formed, which terminates in a center land portion at one end, and a middle land portion adjacent to the center land portion has a circumferential narrow groove and a groove penetrating the circumferential narrow groove and communicating with both main grooves.

In the pneumatic tire described in Japan Patent No. 4581732, the first lug grooves, extending in the tire lateral direction with only one ends communicating with the main groove, are formed in the respective ribs at a predetermined interval in the tire circumferential direction, and at least one sipe is formed between the each first lug groove of the respective ribs with only one end communicating with the first lug groove and extending in the tire circumferential direction at such a position as to substantially equally divide a rib width. However, in order to further improve drainage properties and enhance steering stability performance on wet road surfaces, the first lug groove or the sipe has to be elongated. Thus, the rigidity of the rib is decreased, probably resulting in reduction in steering stability performance on dry road surfaces.

In the pneumatic tire described in Japan Patent No. 5443923, every circumferential grooves in contact with the land portion on both sides thereof, have the sipe that opens to the circumferential groove at one end and terminates within the land portion at the other end, the sipe having an inclined portion communicating with the circumferential groove and extending with some inclination to the tire equatorial plane, and a linear portion connected to the inclined portion and extending along the tire equatorial plane. However, in order to further improve drainage properties and enhance steering stability performance on wet road surfaces, the sipe has to be elongated. Thus, the rigidity of the land portion is decreased, probably resulting in reduction in steering stability performance on dry road surfaces.

In the pneumatic tire described in Japan Unexamined Patent Publication No. 2015-013603, since the center land portion has no groove, the drainage properties are insufficient. This probably results in reduction in steering stability performance on wet road surfaces. Also, since the middle land portion has the lateral groove communicating with both main grooves, the rigidity of the land portion is decreased, probably resulting in reduction in steering stability performance on dry road surfaces.

In the pneumatic tire described in Japan Patent No. 5185989, a groove is formed, which terminates in the center land portion at one end. However, drainage properties are insufficient because of its linear, short shape, probably resulting in reduction in steering stability performance on wet road surfaces. Also, since the middle land portion has a groove penetrating the circumferential narrow groove and communicating with both main grooves, the rigidity of the land portion is decreased, probably resulting in reduction in steering stability performance on dry road surfaces.

SUMMARY

The present technology provides a pneumatic tire that can improve steering stability performance on wet road surfaces while ensuring steering stability performance on dry road surfaces.

An aspect of the present technology provides a pneumatic tire including: a plurality of main grooves formed on a tread surface of a tread portion, extending in a tire circumferential direction in alignment in a tire lateral direction, the plurality of main grooves defining a center land portion arranged on a tire equatorial plane and middle land portions adjacent on both sides of the center land portion; a sipe formed in the center land portion with one end communicating with the main grooves on both sides in the tire lateral direction and the other end terminating within the center land portion, the sipe bending halfway through its length from the one end to the other end; a circumferential narrow groove extending in the tire circumferential direction in each of the middle land portions, and dividing each of the middle land portions into a rib-shaped middle inner land portion on an inner side in the tire lateral direction and a middle outer land portion on an outer side in the tire lateral direction; and a plurality of lug grooves formed in the middle outer land portion of the middle land portion in alignment in the tire circumferential direction, communicating with the main groove on an outer side in the tire lateral direction and the circumferential narrow groove, and dividing the middle outer land portion into blocks, wherein a width d1 of the middle inner land portion and a groove width d2 of the circumferential narrow groove satisfying a relationship of $0.1 \leq d2/d1 \leq 0.4$.

According to this pneumatic tire, the sipe is formed in the center land portion, bending halfway through its length from one end to the other end, whereby the sipe can be elongated compared with a linear sipe, and the drainage properties can be improved to enhance steering stability performance on wet road surfaces. Moreover, according to this pneumatic tire, the circumferential narrow groove defines the rib-shaped middle inner land portion on an inner side in the tire lateral direction, of the middle land portion, and the lug groove defines the block-shaped middle outer land portion on an outer side in the tire lateral direction, of the middle land portion, whereby the circumferential narrow groove and the lug groove can improve drainage properties to enhance steering stability performance on wet road surfaces. Also, owing to the rib-shaped middle inner land portion, it is possible to ensure steering stability performance on dry road surfaces while maintaining the rigidity of the middle land portion. In particular, according to this pneumatic tire, $d2/d1$ of 0.1 or more allows a larger groove width of the circumferential narrow groove, making it possible to improve drainage properties to enhance steering stability performance on wet road surfaces. On the other hand, $d2/d1$ of 0.4 or less allows a larger width of the rib-shaped middle inner land portion, making it possible to ensure steering stability performance on dry road surfaces while maintaining the rigidity of the middle land portion.

Also, in the pneumatic tire according to the aspect of the present technology, it is preferred that a width D1 of the middle land portion and a width d1 of the middle inner land portion satisfy a relationship of $0.2 \leq d1/D1 \leq 0.5$.

According to this pneumatic tire, $d1/D1$ of 0.2 or more allows the rib-shaped middle inner land portion to have the larger width d1, making it possible to ensure steering stability performance on dry road surfaces while maintaining the rigidity of the middle land portion. On the other hand, $d1/D1$ of 0.5 or less allows a larger width of the block-shaped middle outer land portion with the lug groove, making it possible to improve drainage properties to enhance steering stability performance on wet road surfaces.

In the pneumatic tire according to the aspect of the present technology, it is preferred that a ground contact width TW of the tread surface, a width D1 of the middle land portion, and a width D2 of the center land portion satisfy relationships of $0.1 \leq D1/TW \leq 0.3$, $0.1 \leq D2/TW \leq 0.3$, $0.6 \leq D2/D1 \leq 1.0$.

According to this pneumatic tire, D1/TW of 0.1 or more allows the middle land portion to have the larger width D1, and the lug groove of the block-shaped middle outer land portion and the circumferential narrow groove make it possible to improve drainage properties to enhance steering stability performance on wet road surfaces or the rib-shaped middle inner land portion makes it possible to ensure steering stability performance on dry road surfaces while maintaining the rigidity. On the other hand, D1/TW of 0.3 or less makes it possible to prevent such situations that the width D1 of the middle land portion is increased and the block-shaped middle outer land portion accounts for a larger region to thereby reduce the rigidity to lower steering stability performance on wet road surfaces, or the rib-shaped middle inner land portion accounts for a larger region to thereby reduce drainage properties to lower steering stability performance on wet road surfaces.

Moreover, according to this pneumatic tire, D2/TW of 0.1 or more allows the larger width of the center land portion, making it possible to improve drainage properties with the sipe to thereby enhance steering stability performance on wet road surfaces or ensure steering stability performance on dry road surfaces while maintaining the rigidity of a portion having no sipe. On the other hand, D2/TW of 0.3 or less makes it possible to prevent such situations that the width D2 of the center land portion is increased and the sipe accounts for a larger region to thereby reduce the rigidity to lower steering stability performance on wet road surfaces, or a portion having no sipe accounts for a larger region to thereby reduce drainage properties to lower steering stability performance on wet road surface.

Moreover, when an accounting ratio of D2/D1 is set to an appropriate range, a significant effect can be obtained as follows: steering stability performance on dry road surfaces is ensured while maintaining the rigidity of the land portion or drainage properties are improved to enhance steering stability performance on wet road surfaces.

Also, in the pneumatic tire according to the aspect of the present technology, it is preferred that the sipe extends straight bending halfway through its length, a tire lateral direction length $\alpha$ from the one end communicating with the main groove to a bent portion is 1 mm or more, and the tire lateral direction length $\alpha$ and a width D2 of the center land portion satisfy a relationship of $\alpha/D2 \leq 0.4$, and the sipe has an angle $\beta$ satisfying a relationship of $30° < \beta < 150°$ relative to the main groove, at the one end communicating with the main groove.

According to this pneumatic tire, the tire lateral direction length $\alpha$ of the sipe from the one end communicating with the center main groove to the bent portion is set to 1 mm or more, whereby contact with the ground, of an edge portion close to the main groove in the rib-shaped center land portion can be ensured and reduction in steering stability performance on dry road surfaces can be prevented. Moreover, $\alpha/D2$ of 0.4 or less makes it possible to ensure contact with the ground, of the edge portion of the sipe and prevent reduction in steering stability performance on wet road surfaces.

Also, in the pneumatic tire according to the aspect of the present technology, it is preferred that a tire lateral direction length $\gamma$ of the sipe from the one end communicating with the main groove to the terminating other end and a width D2 of the center land portion satisfy a relationship of $\gamma/D2 \leq \frac{1}{2}$.

According to this pneumatic tire, it is possible to prevent reduction in rigidity of the center land portion and ensure steering stability performance on dry road surfaces.

In the pneumatic tire according to the aspect of the present technology, the form of the sipe from the one end communicating with the main groove to the terminating other end is formed being inclined to the tire circumferential direction, the form of the lug groove from the outer main groove in the tire lateral direction in the middle land portion to the circumferential narrow groove is formed being inclined to the tire circumferential direction, and the sipe and the lug groove are inclined in the same direction.

According to this pneumatic tire, the sipe and the lug groove are inclined in the same direction, whereby making it possible to drain water in the same direction to improve drainage properties thereby improve steering stability performance on wet road surfaces.

The pneumatic tire according to the present technology, it is possible to improve steering stability performance on wet road surfaces while ensuring steering stability performance on dry road surfaces.

BRIEF DESCRIPTION OF DRAWINGS

FIGS. 3A-3B include a table showing the results of performance tests of pneumatic tires according to examples of the present technology.

FIG. 4 is a table showing the results of performance tests of pneumatic tires according to examples of the present technology.

DETAILED DESCRIPTION

Embodiments of the present technology are described in detail below with reference to the drawings. However, the present technology is not limited by the embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
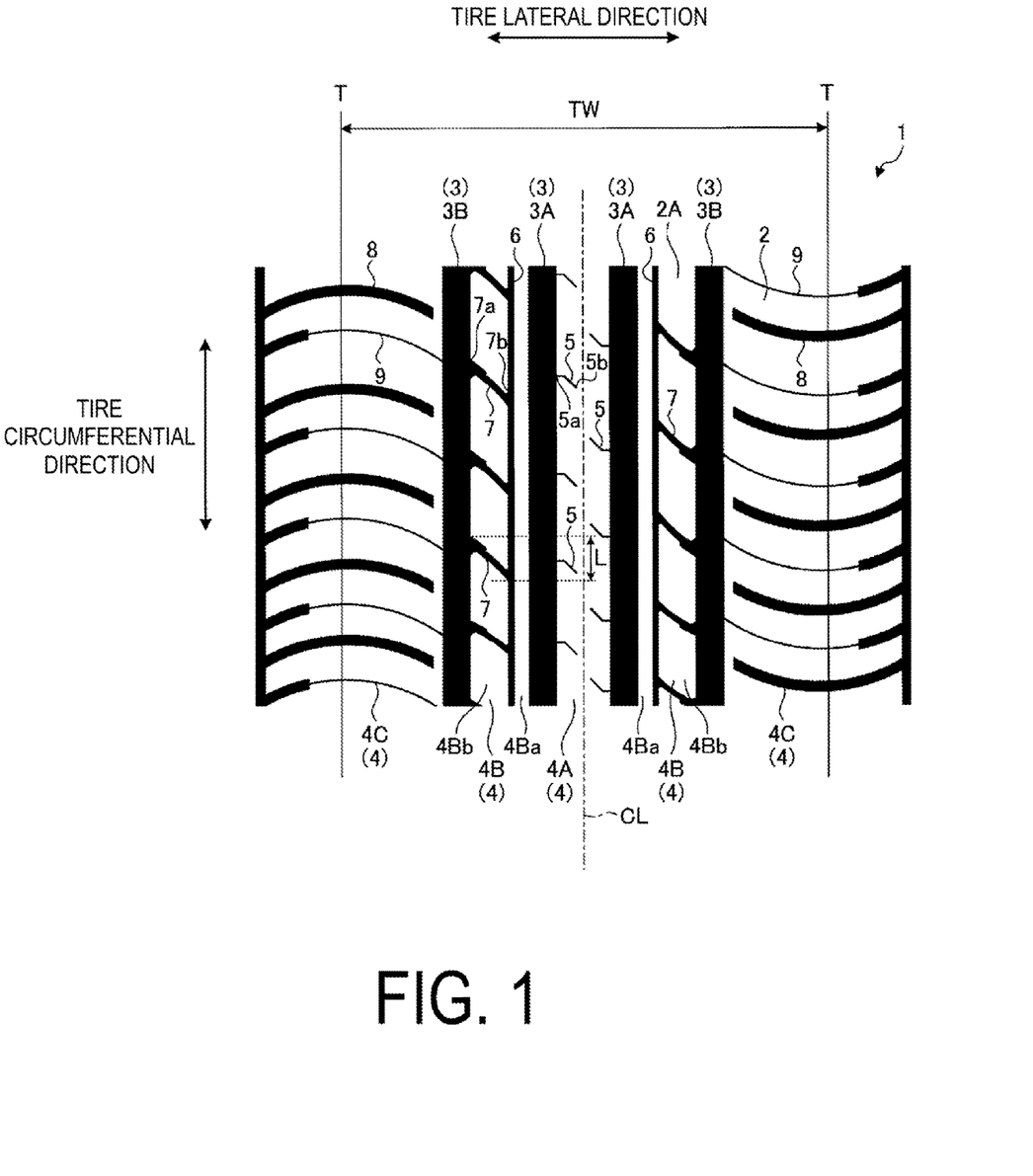
FIG. 1 is a plan view of a tread portion of a pneumatic tire according to an embodiment of the present technology.
Figure 2:
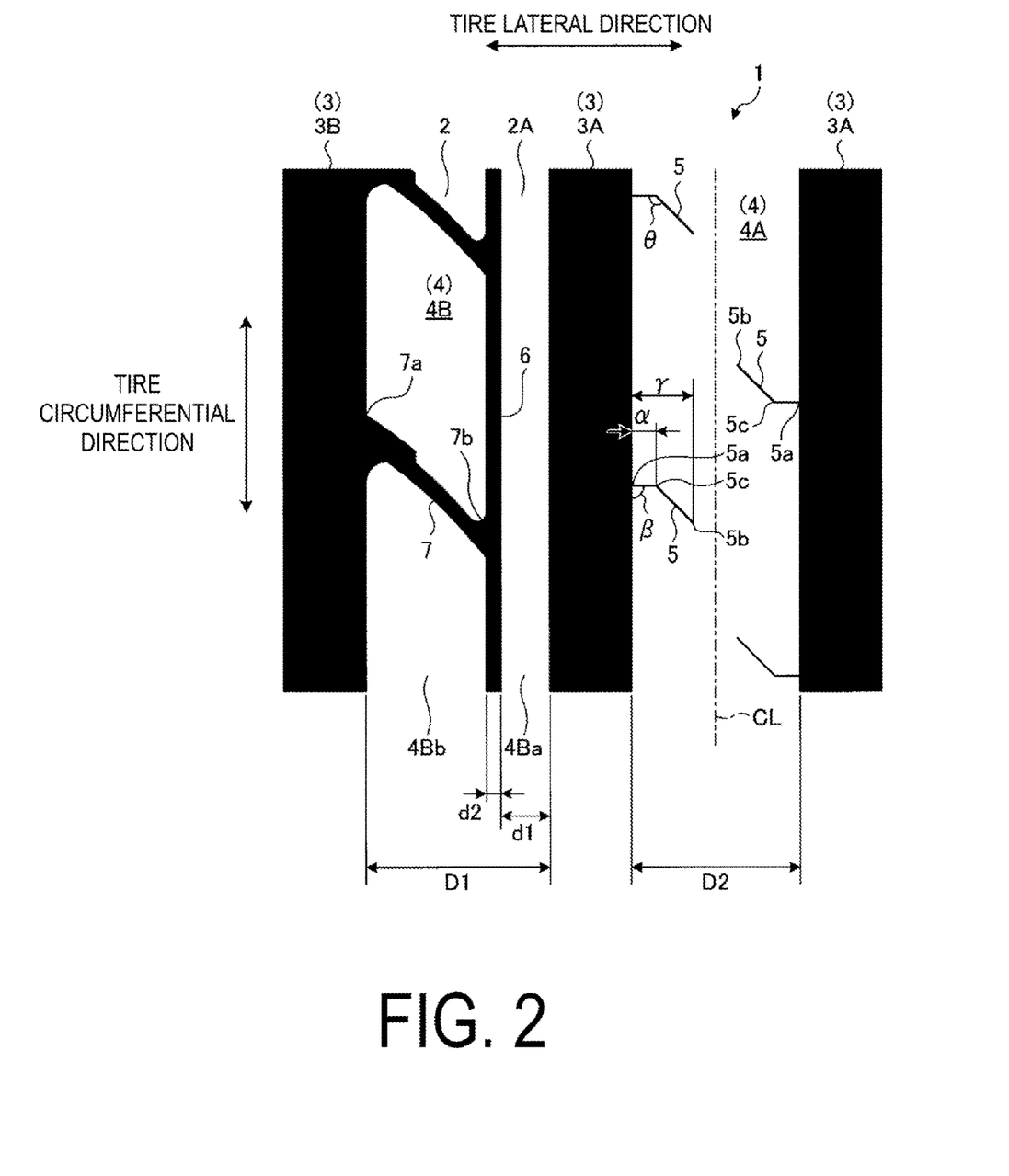
FIG. 2 is a partial enlarged plan view of the tread portion of the pneumatic tire according to the embodiment of the present technology.

FIG. 1 is a plan view of a tread portion of a pneumatic tire according to an embodiment of the present technology. FIG. 2 is a partial enlarged plan view of the tread portion of the pneumatic tire according to the embodiment of the present technology.

Herein, "tire circumferential direction" refers to a circumferential direction with a rotation axis (not illustrated) of a pneumatic tire 1 as a center axis. Additionally, "tire lateral direction" refers to a direction parallel with the rotation axis. "Inner side in the tire lateral direction" refers to the direction toward a tire equatorial plane CL (tire equator line) in the tire lateral direction. "Outer side in the tire lateral direction" refers to a direction away from the tire equatorial plane CL in the tire lateral direction. "Tire radial direction" refers to a direction orthogonal to the rotation axis. "Tire equatorial plane CL" refers to a plane orthogonal to the rotation axis that passes through the center of the tire width of the pneumatic tire 1. "Tire equator line" refers to the line along the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 of the present embodiment includes a tread portion 2. The tread portion 2 is formed from a rubber material and is exposed on the outermost side in the tire radial direction of the pneumatic tire 1, and the surface thereof constitutes the profile of the pneumatic tire 1 as a tread surface 2a.

The tread portion 2 includes a plurality of main grooves 3 (four in the present embodiment) extending in the tire circumferential direction and disposed in alignment in the tire lateral direction. In the present embodiment, two main grooves 3 formed on near side of the tire equatorial plane CL at the center in the tire lateral direction, are referred to as center main grooves (first main grooves) 3A. Also, main grooves 3 formed on both outer sides in the tire lateral direction from each center main groove 3A, are referred to as shoulder main grooves (second main grooves) 3B. Note that the main grooves 3 are defined as having a groove width of from 4 mm to 20 mm, and a groove depth (dimension in the tire radial direction from the opening position on the tread surface 2A to the groove bottom) of from 5 mm to 15 mm.

The tread surface 2a of the tread portion 2 includes a plurality of land portions 4 (five in the present embodiment) defined in the tire lateral direction by the circumferential grooves 3. Moreover, in the present embodiment, the land portion 4 formed on the tire equatorial plane CL between the respective center main grooves 3A is referred to as the center land portion 4A. Also, the land portion 4 formed between the center main groove 3A and the shoulder main groove 3B on the outer side in the tire lateral direction of the center main groove 3A is referred to as the middle land portion 4B. Furthermore, the land portions 4 on the outer side in the tire lateral direction of each shoulder main grooves 3B are referred to as shoulder land portions 4C.

Only the sipe 5 is formed at the center land portion 4A. The sipe 5 has one end 5a communicating with the center main groove 3A and the other end 5b terminating within the center land portion 4A. Hence, the center land portion 4A is formed in a rib shape continuous along in the tire circumferential direction. Also, the sipe 5 is formed to extend, mainly in the tire lateral direction toward the center main groove 3A adjacent to the center main groove 3A with which the one end 5a communicates, from the one end 5a to the other end 5b with some inclination to the tire circumferential direction. Also, the sipe 5 extends from the one end 5a to the other end 5b, bending halfway through its length. The illustrated sipe 5 formed in chevron shape, i.e., extends straight from the one end 5a, bends at a bent portion (bend point) 5c, and extends straight from the bent portion 5c to the other end 5b. Note that although not illustrated, the sipe 5 may be curved halfway through its length from the one end 5a to the other end 5b. The plurality of sipes 5 are formed along one center main groove 3A inclining in the same direction. Also, the sipes 5 are formed inclining in the same direction and being alternately in the tire circumferential direction at each of the adjacent center main grooves 3A. Note that the sipe 5 is defined as having a groove width of from 0.3 mm to 1.5 mm, and a groove depth (tire radial direction dimension from the opening position on the tread surface 2A to the groove bottom) of from 1.5 mm to 6 mm.

The middle land portion 4B has only the circumferential narrow groove 6 and the lug groove 7. The circumferential narrow groove 6 extends along in the tire circumferential direction in parallel to the main groove 3. Thus, the middle land portion 4B is divided with the circumferential narrow groove 6 as a boundary into a middle inner land portion 4Ba on an inner side in the tire lateral direction (center main groove 3A side) and a middle outer land portion 4Bb on an outer side in the tire lateral direction (shoulder main groove 3B side). Note that the circumferential narrow groove 6 is defined as having a groove width of from 1.5 mm to 3 mm and also larger than that of the sipe 5, and a groove depth (tire radial direction dimension from the opening position on the tread surface 2A to the groove bottom) of from 1.5 mm to 7 mm.

The lug groove 7 is formed in the middle outer land portion 4Bb on the outer side in the tire lateral direction, which is defined by dividing the middle land portion 4B with the circumferential narrow groove 6. The plurality of lug grooves 7 are formed in alignment in the tire circumferential direction, communicating with the shoulder main groove 3B on the outer side in the tire lateral direction and the circumferential narrow groove 6. Hence, the middle outer land portion 4Bb is formed into a block shape defined by the shoulder main groove 3B on an outer side in the tire lateral direction, the circumferential narrow groove 6, and the lug groove 7. Also, the middle inner land portion 4Ba has a rib shape defined by the center main groove 3A on an inner side in the tire lateral direction and the circumferential narrow groove 6 and continuously extending in the tire circumferential direction. This middle inner land portion 4Ba is also referred to as a narrow rib. Also, the lug grooves 7 each are formed to extend with some inclination to the tire circumferential direction, from one end 7a communicating with the shoulder main groove 3B toward the other end 7b communicating with the circumferential narrow groove 6. The inclination direction of the lug groove 7 is the same as the sipe 5. Note that the lug groove 7 is defined as having a groove width of from 1.5 mm to 4.0 mm, which is larger than that of the sipe and the circumferential narrow groove 6, and a groove depth (tire radial direction dimension from the opening position on the tread surface 2A to the groove bottom) of from 1.5 mm to 7.0 mm.

The shoulder land portion 4C has only lug grooves 8 and sipes 9. The plurality of lug grooves 8 are formed in alignment in the tire circumferential direction, extending in the tire lateral direction. The lug grooves 8 terminate within a ground contact region without communicating with the shoulder main groove 3B and extend outward in the tire lateral direction beyond a ground contact edge T. The plurality of sipes 9 are formed between the lug grooves 8 in alignment in the tire circumferential direction, extending in the tire lateral direction. The sipes 9 communicate with the shoulder main groove 3B and extend outward in the tire lateral direction beyond the ground contact edge T. Note that the lug groove 8 is defined as having a groove width of from 1.5 mm to 6.0 mm, which is larger than the sipe 5 and the circumferential narrow groove 6, and a groove depth (tire radial direction dimension from the opening position on the tread surface 2A to the groove bottom) of from 1.5 mm to 7.0 mm. The sipe 9 is defined as having a groove width of from 0.3 mm to 1.5 mm and a groove depth (tire radial direction dimension from the opening position on the tread surface 2A to the groove bottom) of from 1.5 mm to 6 mm.

Here, the ground contact edge T refers to the outermost edge of the ground contact region in the tire lateral direction. In FIG. 1, the ground contact edges T are illustrated continuously in the tire circumferential direction. The ground contact region is a region where the tread surface 2A of the tread portion 2 of the pneumatic tire 1 comes into contact with the dry flat road surface, when the pneumatic tire 1 is mounted on a regular rim, inflated to the regular internal pressure, and loaded with 70% of the regular load. The tire lateral direction dimension of the ground contact region between the ground contact edges T is referred as a ground contact width TW. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

The pneumatic tire 1 of the present embodiment is symmetrically formed on both sides in the tire width direction with the tire equatorial plane CL as a boundary. Also, the pneumatic tire 1 of the present embodiment described here has four main grooves 3 and five land portions 4. However, any configuration is applicable as long as the center land portion 4A on the tire equatorial plane CL and the middle land portions 4B on both sides in the tire lateral direction of the center land portion 4A are provided. For example, the following configuration may also be applicable: five main grooves 3 and seven land portions 4 are formed, and an additional main groove 3 is formed between the middle land portion 4B and the shoulder land portion 4C to further divide the land portion 4.

As described above, in the pneumatic tire 1 of the present embodiment, the plural main grooves 3 extending in the tire circumferential direction in alignment in the tire lateral direction define, in the tread surface 2A of the tread portion 2, the center land portion 4A on the tire equatorial plane CL and middle land portions 4B adjacent on both sides of the center land portion 4A in the tire lateral direction. Also, the pneumatic tire 1 of the present embodiment includes the sipe 5 formed in the center land portion 4A with one end 5a communicating with the center main grooves 3A on both sides in the tire lateral direction and the other end terminating within the center land portion 4A, the sipe bending halfway through its length from the one end 5a to the other end 5b, the circumferential narrow groove 6 formed in the middle land portion 4B, extending in the tire circumferential direction to divide the middle land portion 4B into the rib-shaped middle inner land portion 4Ba on an inner side in the tire lateral direction and the middle outer land portion 4Bb on an outer side in the tire lateral direction, and the plurality of lug grooves 7 formed in the middle outer land portion 4Bb of the middle land portion 4B, in alignment in the tire circumferential direction and communicating with the shoulder main groove 3B on an outer side in the tire lateral direction and the circumferential narrow groove 6 to divide the middle outer land portion 4Bb into blocks. Additionally, as illustrated in FIG. 2, in the pneumatic tire 1, a width d1 of the middle inner land portion 4Ba and a groove width d2 of the circumferential narrow groove 6 satisfy a relationship of $0.1 \leq d2/d1 \leq 0.4$. Note that a range of the groove width d2 is preferably from 1 mm to 6 mm.

According to this pneumatic tire 1, the sipe 5 is formed in the center land portion 4A, bending halfway through its length from the one end 5a to the other end 5b, whereby the sipe can be elongated compared with a linear sipe. Thus, the drainage properties can be improved to enhance steering stability performance on wet road surfaces. Moreover, according to this pneumatic tire 1, the circumferential narrow groove 6 defines the rib-shaped middle inner land portion 4Ba on an inner side in the tire lateral direction of the middle land portion 4B, and the lug groove 7 defines the block-shaped middle outer land portion 4Bb on an outer side in the tire lateral direction of the middle land portion 4B, whereby the drainage properties can be improved by the circumferential narrow groove 6 and the lug groove 7 to enhance steering stability performance on wet road surfaces. In addition, the steering stability performance on dry road surfaces can be ensured while maintaining the rigidity of the middle land portion 4B by the rib-shaped middle inner land portion 4Ba. In particular, according to this pneumatic tire 1, d2/d1 of 0.1 or more allows a larger groove width of the circumferential narrow groove 6. Hence, the drainage properties can be improved to enhance steering stability performance on wet road surfaces. On the other hand, d2/d1 of 0.4 or less allows a larger width of the rib-shaped middle inner land portion 4Ba, making it possible to ensure steering stability performance on dry road surfaces while maintaining the rigidity of the middle land portion 4B.

Also, as illustrated in FIG. 2, in the pneumatic tire 1 of the present embodiment, it is preferred that a width D1 of the middle land portion 4B and a width d1 of the middle inner land portion 4Ba satisfy a relationship of $0.2 \leq d1/D1 \leq 0.5$.

According to this pneumatic tire, d1/D1 of 0.2 or more allows the rib-shaped middle inner land portion 4Ba to have the larger width d1, making it possible to ensure steering stability performance on dry road surfaces while maintaining the rigidity of the middle land portion 4B. On the other hand, d1/D1 of 0.5 or less allows a larger width of the block-shaped middle outer land portion 4Bb with the lug groove 7, making it possible to improve drainage properties to enhance steering stability performance on wet road surfaces.

Also, as illustrated in FIGS. 1 and 2, in the pneumatic tire 1 of the present embodiment, it is preferred that the ground contact width TW of the tread surface 2A, the width D1 of the middle land portion 4B, and a width D2 of the center land portion 4A satisfy relationships of $0.1 \leq D1/TW \leq 0.3$, $0.1 \leq D2/TW \leq 0.3$, $0.6 \leq D2/D1 \leq 1.0$.

According to this pneumatic tire 1, D1/TW of 0.1 or more allows the middle land portion 4B to have the larger width D1, and the lug groove 7 of the block-shaped middle outer land portion 4Bb and the circumferential narrow groove 6 make it possible to improve drainage properties to enhance steering stability performance on wet road surfaces or the rib-shaped middle inner land portion 4Ba makes it possible to ensure steering stability performance on dry road surfaces while maintaining the rigidity. On the other hand, D1/TW of 0.3 or less makes it possible to prevent such situations that the width D1 of the middle land portion 4B is increased and the block-shaped middle outer land portion 4Bb accounts for a larger region to reduce the rigidity to thereby lower steering stability performance on wet road surfaces, or the rib-shaped middle inner land portion 4Ba accounts for a larger region to reduce the drainage properties to thereby lower steering stability performance on wet road surfaces.

Moreover, according to this pneumatic tire 1, D2/TW of 0.1 or more allows the larger width D2 of the center land portion 4A, making it possible to improve drainage properties with the sipe 5 to thereby enhance steering stability performance on wet road surfaces or ensure steering stability performance on dry road surfaces while maintaining the rigidity of a portion having no sipe 5. On the other hand, D2/TW of 0.3 or less makes it possible to prevent such situations that the width D2 of the center land portion 4A is increased and the sipe 5 accounts for a larger region to thereby reduce the rigidity to lower steering stability performance on wet road surfaces or a portion having no sipe 5 accounts for a larger region to thereby reduce drainage properties to lower steering stability performance on wet road surface.

Moreover, if the ratio of D2/D1 is set to an appropriate range, a significant effect can be produced: the steering stability performance on dry road surfaces is ensured while maintaining the rigidity of the land portion 4 and the drainage properties are improved to enhance steering stability performance on wet road surfaces.

Also, in the pneumatic tire 1 of the present embodiment, as illustrated in FIG. 2, it is preferred that the sipe 5 extends straight bending halfway through its length, a tire lateral direction length $\alpha$ from the one end 5a communicating with the center main groove 3A to the bent portion 5c is 1 mm or more, the tire lateral direction length $\alpha$ and the width D2 of the center land portion 4A satisfy a relationship of $\alpha/D2 \leq 0.4$, and the sipe 5 forms an angle $\beta$ to the center main groove 3A at the one end 5a communicating with the center main groove 3A so that the angle $\beta$ satisfies a relationship of $30° < \beta < 150°$.

According to this pneumatic tire 1, when the tire lateral direction length $\alpha$ from the one end 5a communicating with the center main groove 3A of the sipe 5 to the bent portion 5c is set to 1 mm or more, contact with the ground of an edge portion (edge portion in the width D2 of the center land portion 4A) close to the main groove 3A of the center land portion 4A can be ensured and reduction in steering stability performance on dry road surfaces can be prevented. Moreover, $\alpha/D2$ of 0.4 or less makes it possible to ensure contact with the ground of the edge portion of the sipe 5 and prevent reduction in steering stability performance on wet road surfaces. Note that it is preferred to set $\alpha/D2$ to 0.25 or less to further ensure contact with the ground of the edge portion of the sipe 5 and further prevent reduction in steering stability performance on wet road surfaces.

Also, as illustrated in FIG. 2, in the pneumatic tire 1 of the present embodiment, it is preferred that a tire lateral direction length $\gamma$ of the sipe 5 from the one end 5a communicating the center main groove 3A to the terminating other end 5b and the width D2 of the center land portion 4A satisfy a relationship of $\gamma/D2 \leq \frac{1}{2}$.

According to this pneumatic tire 1, it is possible to prevent reduction in rigidity of the center land portion 4A and improve steering stability performance on dry road surfaces. Note that in order to further ensure the steering stability performance on dry road surfaces, it is preferred to satisfy a relationship of $\gamma/D2 \leq \frac{1}{3}$.

Also, as illustrated in FIG. 1, in the pneumatic tire 1 of the present embodiment, a form of the sipe 5 from the one end 5a communicating with the center main groove 3A to the terminating other end 5b, is formed being inclined to the tire circumferential direction, a form of the lug groove 7 from the shoulder main groove 3B on an outer side in the tire lateral direction of the middle land portion 4B is formed being inclined to the tire circumferential direction. It is preferred that the sipe 5 and the lug groove 7 are inclined in the same direction.

According to this pneumatic tire 1, the sipe 5 and the lug groove 7 are inclined in the same direction, making it possible to drain water in the same direction to improve drainage properties and enhance steering stability performance on wet road surfaces.

Note that in the pneumatic tire 1 of the present embodiment, as illustrated in FIG. 1, it is preferred that a range of the sipe 5 in the tire circumferential direction is within a range L of the lug groove 7 on an outer side in the tire lateral direction of the sipe 5. With this, steering stability performance on wet road surfaces can be enhanced by effectively utilizing an edge effect of the sipe 5.

As illustrated in FIG. 2, in the pneumatic tire 1 of the present embodiment, it is preferred that the sipe 5 extends straight bending halfway through its length with an angle $\theta$ at the bent portion 5c, which satisfies a relationship of $100° \leq \theta \leq 170°$. If the angle $\theta$ is 100° or more, the tread rigidity is improved and the steering stability performance on dry road surfaces can be easily ensured. Also, if the angle $\theta$ is 170° or less, the sipe 5 can have a sufficient length, and steering stability performance on wet road surfaces can be increased more.

Also, in the pneumatic tire 1 of the present embodiment, as illustrated in FIG. 2, it is preferred that the sipe 5 extends straight bending halfway through its length so that the tire lateral direction length $\alpha$ from the one end 5a communicating with the center main groove 3A to the bent portion 5c and the tire lateral direction length $\gamma$ from the one end 5a communicating with the center main groove 3A to the terminating other end 5b satisfy a relationship of $0.2 \leq \alpha/\gamma \leq 0.8$. If $\alpha/\gamma$ is 0.2 or more, the rigidity of the tread portion 2 can be improved and the steering stability performance on dry road surfaces can be easily ensured. Also, if α/γ is 0.8 or less, the edge effect of the sipe 5 can be easily obtained, and the steering stability performance on wet road surfaces can be improved more.

Examples

In the examples, performance tests for steering stability on dry and wet road surfaces were performed on a plurality of types of test tires of different conditions (see FIGS. 3A-3B and 4).

In these performance tests, a pneumatic tire of tire size 225/65 R 17 102 H was used as a test tire. The test tire was mounted on a regular rim of 17×7 JJ, inflated to the regular internal pressure (230 kPa), and mounted on a test vehicle (domestic recreational vehicle (RV)).

A method of evaluating the steering stability on dry road surfaces was to drive the test vehicle on a dry test course, and sensory evaluation was carried out by one experienced test driver for the responsiveness (responsiveness just after steering operations) when changing lanes and when cornering. This sensory evaluation provided evaluation results using index values based on a pneumatic tire of the related art (used as a reference (100)). The higher the index values, the higher the steering stability performance on dry road surfaces.

A method of evaluating the steering stability on wet road surfaces was to drive the test vehicle on a wet test course with the water depth of 3 mm, and sensory evaluation was carried out by one experienced test driver for the steering characteristics when changing lanes and when cornering, and the stability when traveling straight. This sensory evaluation provided evaluation results using index values based on a pneumatic tire of the related art (used as a reference (100)). The higher the index values, the higher the steering stability performance on wet road surfaces.

In all of the pneumatic tires shown in FIGS. 3A-3B and 4, four main grooves were formed within the ground contact width, and five land portions were defined. The pneumatic tire of the related art had no sipe in the center land portion. Also, the pneumatic tire of the related art had the lug groove in the middle land portion, by which the rib-shaped middle inner land portion was defined and the middle outer land portion was divided into blocks by the lug groove. The pneumatic tires of Comparative Examples 1 and 2 had a bent sipe in the center land portion. The pneumatic tire of Comparative Example 1 had the circumferential narrow groove in the middle land portion to define the rib-shaped middle inner land portion and middle outer land portion. The pneumatic tire of Comparative Example 2 had the circumferential narrow groove and the lug groove in the middle land portion to define the rib-shaped middle inner land portion.

On the other hand, the pneumatic tires of Examples 1 to 15 had the bent sipe in the center land portion. Also, the pneumatic tire of Examples 1 to 15 had the circumferential narrow groove and the lug groove in the middle land portion, by which the rib-shaped middle inner land portion is formed and the middle outer land portion is divided into blocks by the lug groove.

As can be seen from the test results in FIGS. 3A-3B and 4, the pneumatic tires of Examples 1 to 15 have improved steering stability performance on wet road surfaces while ensuring steering stability performance on dry road surfaces.

The invention claimed is:

1. A pneumatic tire comprising:
a plurality of main grooves formed on a tread surface of a tread portion, extending in a tire circumferential direction in alignment in a tire lateral direction, the plurality of main grooves defining a center land portion arranged on a tire equatorial plane and middle land portions adjacent on both sides of the center land portion;
a sipe formed in the center land portion with one end communicating with the main grooves on both sides in the tire lateral direction and an other end terminating within the center land portion, the sipe bending halfway through its length from the one end to the other end;
a circumferential narrow groove extending in the tire circumferential direction in each of the middle land portions, and dividing each of the middle land portions into a rib-shaped middle inner land portion on an inner side in the tire lateral direction and a middle outer land portion on an outer side in the tire lateral direction; and
a plurality of lug grooves formed in the middle outer land portion of the middle land portion in alignment in the tire circumferential direction, communicating with the main groove on an outer side in the tire lateral direction and the circumferential narrow groove, and dividing the middle outer land portion into blocks;
a width d1 of the middle inner land portion and a groove width d2 of the circumferential narrow groove satisfying a relationship of $0.1 \leq d2/d1 \leq 0.4$;
wherein a form of the sipe from the one end communicating with the main groove to the other end is formed being inclined to the tire circumferential direction, a form of the lug groove from an outer main groove in the tire lateral direction in the middle land portion to the circumferential narrow groove is formed being inclined to the tire circumferential direction, and part of the sipe and the lug groove are inclined in a same direction.

2. The pneumatic tire according to claim 1, wherein a ground contact width TW of the tread surface, a width D1 of the middle land portion, and a width D2 of the center land portion satisfy relationships of $0.1 \leq D1/TW \leq 0.3$, $0.1 \leq D2/TW \leq 0.3$, $0.6 \leq D2/D1 \leq 1.0$.

3. The pneumatic tire according to claim 1, wherein the sipe extends straight bending halfway through its length, a tire lateral direction length α from the one end communicating with the main groove to a bent portion is 1 mm or more, and the tire lateral direction length α and a width D2 of the center land portion satisfy a relationship of $\alpha/D2 \leq 0.4$, and the sipe has an angle β satisfying a relationship of $30° \leq \beta \leq 150°$ relative to the main groove, at the one end communicating with the main groove.

4. The pneumatic tire according to claim 1, wherein a tire lateral direction length γ of the sipe from the one end communicating with the main groove to the other end and a width D2 of the center land portion satisfy a relationship of $\gamma/D2 \leq \frac{1}{2}$.

5. The pneumatic tire according to claim 1, wherein a width D1 of the middle land portion and a width d1 of the middle inner land portion satisfy a relationship of $0.2 \leq d1/D1 \leq 0.5$.

6. The pneumatic tire according to claim 5, wherein a ground contact width TW of the tread surface, a width D1 of the middle land portion, and a width D2 of the center land portion satisfy relationships of $0.1 \leq D1/TW \leq 0.3$, $0.1 \leq D2/TW \leq 0.3$, $0.6 \leq D2/D1 \leq 1.0$.

7. The pneumatic tire according to claim 6, wherein the sipe extends straight bending halfway through its length, a tire lateral direction length α from the one end communicating with the main groove to a bent portion is 1 mm or more, and the tire lateral direction length $\alpha$ and a width D2 of the center land portion satisfy a relationship of $\alpha/D2 \leq 0.4$, and the sipe has an angle $\beta$ satisfying a relationship of $30° < \beta < 150°$ relative to the main groove, at the one end communicating with the main groove.

8. The pneumatic tire according to claim 7,
wherein a tire lateral direction length $\gamma$ of the sipe from the one end communicating with the main groove to the other end and a width D2 of the center land portion satisfy a relationship of $\gamma/D2 \leq \frac{1}{2}$.

* * * * *